(12) United States Patent
Cesarini et al.

(10) Patent No.: US 7,831,027 B2
(45) Date of Patent: Nov. 9, 2010

(54) CONFIGURABLE CHARGING SYSTEM FOR A TELECOMMUNICATIONS SERVICE PROVIDER

(75) Inventors: Andrea Cesarini, Rome (IT); Allessandro Cugno Garrano, Fiorano al Serio (IT)

(73) Assignee: Accenture Global Services Limited, Dublin (IE)

( * ) Notice: Subject to any disclaimer, the term of this patent is extended or adjusted under 35 U.S.C. 154(b) by 1179 days.

(21) Appl. No.: 11/434,007

(22) Filed: May 15, 2006

(65) Prior Publication Data
US 2007/0172040 A1 Jul. 26, 2007

(30) Foreign Application Priority Data
Jan. 25, 2006 (EP) .................................. 06425034
Jan. 25, 2006 (IT) .......................... MI2006A00125

(51) Int. Cl.
*H04M 15/00* (2006.01)
(52) U.S. Cl. .......................... 379/114.03; 379/114.06; 379/119; 379/121.01; 705/34
(58) Field of Classification Search ................. 379/111, 379/114.01, 114.06, 115.01, 116, 121.01, 379/121.02, 114.03, 119, 127.04, 127.05; 705/1, 14.29, 400, 34
See application file for complete search history.

(56) References Cited

U.S. PATENT DOCUMENTS

| 6,456,986 | B1 * | 9/2002 | Boardman et al. | ......... 705/400 |
|---|---|---|---|---|
| 7,305,073 | B2 * | 12/2007 | Gioberti | ............... 379/114.03 |
| 7,526,075 | B2 * | 4/2009 | Guo et al. | .............. 379/114.03 |
| 2002/0107754 | A1 * | 8/2002 | Stone | ......................... 705/26 |
| 2006/0036448 | A1 * | 2/2006 | Haynie et al. | .................. 705/1 |
| 2007/0201642 | A1 * | 8/2007 | Cesarini | ............... 379/114.03 |

FOREIGN PATENT DOCUMENTS

EP 0 903 888 B1 11/2004

OTHER PUBLICATIONS

International Search Report Dated Jul. 7, 2006 for EP Application No. EP 06 42 5034 (8 Pages).
European Extended Search Report, EP Pat. App. No. 06425034.3, mailed Jul. 7, 2006, 8 pages.
Examination Report, AU Pat. App. No. 2007200280, mailed Mar. 25, 2008, 9 pages.
Examination Report, AU Pat. App. No. 2007200280, mailed Jul. 21, 2009, 2 pages.

* cited by examiner

*Primary Examiner*—Binh K Tieu
(74) *Attorney, Agent, or Firm*—Brinks Hofer Gilson & Lione (57) ABSTRACT

A system extension for a billing system adapted to generate customer bills associated with the delivery of telecommunications products and services, wherein the billing system includes software instructions adapted to be executed on a computer server platform, a database for storing product configuration data for a plurality of product offerings and charging tariffs attached to the product offerings, and a user interface allowing a user to interact with and configure portions of the system, the system extension comprising:
an editable derived attributes table that identifies a unit charge rate for tariffs attached to product offerings; and
a charge calculation function for calculating a charge for a tariff attached to a particular product offering based on the unit charge rate identified in the derived attributes table for the tariff.

28 Claims, 5 Drawing Sheets

Charging Tree

| | | | | 200 |
|---|---|---|---|---|
| ☐ File Edit Customer Care Accounts Server Tasks Maintenance ACS Special Features Options Window Help | | | | |
| ✓Save ✗Cancel | Insert Delete Update | | History Close Help | |
| Table Display Name | | | Start Date 1/1/1996 ☐ | |
| dACS_ChargingFramework V2.0 | | | End Date ☐ | |
| Descriptions | | | | |
| ACS Charging Framework Derived attribute Table. The table is accessed to retrieve multiple charging information based on a composite index key | | | | |

202, 204, 206, 208, 210

| Row | ACS General 8 Charging Parameter | Event Type | Event Sub Type | ACS General 5 Charging Parameter [Tariff Id] | ACS Charge Description |
|---|---|---|---|---|---|
| 1 | ACS DSL Lite Access Activation [Gold] | 271 | 12 | 1 | NULL |
| 2 | ACS DSL Lite Access Activation [Silver] | 250 | 11 | 2 | NULL |
| 3 | ACS DSL Lite Access Activation [Gold] | 250 | 10 | 1 | NULL |
| 4 | ACS DSL Lite Access Activation [Silver] | 250 | 11 | 1 | NULL |
| 5 | ACS DSL Lite Access Activation [Silver] | 271 | 12 | 1 | NULL |
| 6 | ACS DSL Lite Access Activation [Gold] | 250 | 10 | 2 | NULL |
| 7 | ACS Triple-Play Bundle | 271 | 46 | 1 | NULL |
| 8 | ACS Triple-Play Bundle | 250 | 40 | 1 | NULL |

↑Up ↓Down |◀ 0 ▶| ▶▶|       ➡Definition...

| Row | ACS General 8 Charging Parameter | ACS General 9 Charging Parameter | ACS General 10 Charging Parameter | ACS Unit Rate | ACS Charge Description |
|---|---|---|---|---|---|
| 1 | NULL | NULL | NULL | 10 | ACS Charge Description |
| 2 | NULL | NULL | NULL | 10 | ACS Charge Description |
| 3 | NULL | NULL | NULL | 10 | ACS Charge Description |
| 4 | NULL | NULL | NULL | 10 | ACS Charge Description |
| 5 | NULL | NULL | NULL | 10 | ACS Charge Description |
| 6 | NULL | NULL | NULL | 10 | ACS Charge Description |
| 7 | NULL | NULL | NULL | 10 | ACS Charge Description |
| 8 | NULL | NULL | NULL | 10 | ACS Charge Description |

CONFIGURABLE CHARGING SYSTEM FOR A TELECOMMUNICATIONS SERVICE PROVIDER

PRIORITY CLAIM

This application claims the benefit of EPO Application No. 06425034.3 filed Jan. 25, 2006, and Italian Application No. MI2006A000125, filed Jan. 25, 2006 both of which are incorporated herein by reference in their entirety.

BACKGROUND

1. Technical Field

The present invention relates to a billing system extension for facilitating the configuration of new product offerings and billing tariffs associated with the delivery of telecommunications products and services. The present invention provides a charging framework for configuring tariffs and calculating the charges associated with internal event tariffs in order to provide charging data to the billing system for generating customer bills.

2. Background Information

Generating customer bills for telecommunication services is a complicated process. Telecommunications service providers typically provide multiple services, and are adding new products and services at an ever increasing rate. Each service typically has its own peculiarities and challenges with regard to calculating service charges. Complicating the billing process further is the fact that each base product or service typically has multiple variants. For example, a base product or service may have multiple price lists depending on a customer's monthly access usage, or based on bandwidth requirements, or other criteria that distinguish different service plans. Special promotions may be provided from time to time which would again alter the price charged for various services. Each service variant must be considered individually in order to calculate the appropriate charges associated with delivering a specific product or service package to a customer.

Another complicating factor in generating customer bills for delivering telecommunications services is that there are often multiple charges that contribute to the total amount charged for delivering a particular product or service variant to a customer. A particular product or service may include charges for monthly usage, recurring monthly fees for equipment rental or line charges, and the like, a one time activation fee or cancellation fee, taxes, and other charges. The amounts charged for each of these components may be the same or different than the amounts charged for other service variants.

In many telecommunications service billing systems, including Accenture's ACS Billing Solution based on Intec's Singl.eView For Convergent Billing (Singl.eView), a product and service offerings are configured and stored in a database. The product configuration contains all of the particulars necessary to define a product or service offering. The product configuration will include data such as, among other things, a product name and various other attributes that distinguish the product or service offering from other product or service offerings. Another significant component of the product configuration is the identification of charging tariffs attached to the product or service offering.

Charging tariffs are software objects which identify the charges associated with a configured product or service offering. A product or service offering may include separate tariffs for external usage charges, taxes, and various internally generated charges such as recurring rental or other monthly service fees, one-time activation or deactivation charges, and the like. The present invention relates the configuration of internal event tariffs and the calculation of the charges associated therewith, such as recurring monthly charges and non-recurring activation fees and other charges. Such tariffs are referred to as internal tariffs because they are events generated within the billing system itself, as opposed to external tariffs such as usage tariffs which are triggered based on input from external sources such as network switches and the like.

As mentioned above, there are multiple product or service attributes that influence the charges applied to a customer's bill relating to the delivery of a particular product or service. Since the total charge is merely a compilation of the charges associated with the various tariffs attached to the particular product or service, some or all of the product or service attributes influence the charge component generated by each of the various tariffs attached to the product or service offerings. Because some or all of these attributes are different for different product or service offerings, the calculation of charges for tariffs will be different from one product to the next. In the past this has required different formulas and different inputs for calculating each tariff for each product variant. This requires extensive changes to the billing system environment each time a new product or service or a new product or service variant is created. In many cases new tables must be added to the database or extensive changes must be made to existing tables to in order to accommodate new product or service configurations and new tariff configurations. In the Singl.eView package and other billing packages, the charging logic must be configured as a hard coded logic. Expensive both in terms of the resources required to implement the new product or service offerings, as well as the amount of time necessary to implement the changes.

Implementing the changes to the billing system can significantly delay new product and service offerings. In a competitive environment where new products and services are a key factor in attracting new customers and retaining existing customers, the delay and costs involved in rolling out new products and services can be very detrimental to a telecommunications service provider's performance. The present invention provides an improved mechanism for configuring new products and services and internal charge event tariffs associated therewith and for calculating the charges associated with such tariffs.

BRIEF SUMMARY

The present invention provides a charging framework for improving the functionality of a telecommunications service provider's billing system. A particular embodiment of the invention is configured to improve the functionality of the Singl.eView billing package. The charging framework facilitates the configuration of new product and service offerings and the billing tariffs associated therewith, and provides a single charging function for calculating the charges for all internally generated billing events.

The charging framework provides a structured approach to configuring any kind of documented billing tariff. A great deal of time and resources is saved using this approach since all low level billing tariff objects are already created and defined within the charging framework and are immediately ready for use. Such objects include a predefined derived attributes table, a charging function for calculating tariff charges attribute types, reference types, forms, variables, and so forth. When configuring a new tariff the only effort required to support a new product or service offering list to define the price applied to the tariff. No effort is expended on defining all of the hidden underlying objects. A further advantage of the framework is improved performance of the billing system. The entire set of tariff parameters at the charging level may be cached in memory, thereby reducing processing times and conserving database resources.

An embodiment of the invention provides a system extension for a billing system. The billing system is adapted to generate customer bills associated with the delivery of telecommunications products and services. The billing system includes software instructions adapted to be executed on a computer server platform, a database for storing product configuration data for a plurality of product offerings and charging tariffs attached to the product offerings, and a user interface allowing a user to interact with and configure portions of the system. The system extension provides an editable derived attributes table that identifies a unit charge rate for the tariffs attached to configured product offerings. A charge calculation function is also provided for calculating a charge for a tariff attached to a particular product offering. The charge calculation is base on the unit charge rate identified for the given tariff in the derived attributes table.

In another embodiment a method of calculating a charge associated with the delivery of telecommunications services is provided. The method includes creating a derived attributes table for storing a plurality of parametric attribute values associated with defined tariffs. Each defined tariff may be identified by its own set of unique parametric attribute values. The derived attributes table further stores "results" values associated with each tariff. The results values include a unit charge rate associated with each tariff. Next both a product offering and an associated tariff are configured. The tariff is attached to the product offering so that in combination the configured product offering and the configured tariff define the unique set of parametric attribute values corresponding to a tariff stored in the derived attributes table. The corresponding tariff is locating in the derived attributes table based on the defined set of parametric attribute values, and the results values, including the unit charge rate value associated with the defined tariff, are extracted from the derived attributes table. Finally the charge associated with the tariff is calculated based on the extracted unit charge rate.

Another embodiment also provides a method of calculating a charge associated with the delivery of telecommunications products. This method includes creating a charge lookup table for assigning base charges to tariffs. The charge lookup table includes a plurality of stored tariffs, each identifiable by a unique first set of identifiers. A tariff associated with a telecommunications product is configured. The configured tariff and the product define a second set of identifiers capable of identifying the tariff from among a plurality of other tariffs. During the course of preparing a bill, a charging function is executed. The charging function accessed the look up table in order to locate the stored tariff having a first set of identifiers corresponding to the second set of identifiers associated with the configured tariff and the associated product offering to obtain the base charge assigned to the stored tariff. The charging function then calculates the total charge associated with the tariff based on the obtained base charge.

Finally, a method of calculating a billing charge is provided. According to this embodiment a method includes identifying a product associated with a customer. Characteristics of the product configuration must include a product name, a tariff, and one or more charging parameter values associated with the product configuration. The tariff configuration includes an "event type" and an "event sub-type" which are used to mark internal normalized events generated by the tariff during the billing process. When processing a customer bill, the billing system generates a normalized internal event based on the tariff. The normalized internal event is enriched with one or more charging parameter values associated with the product, and the billing system invokes a charging function for identifying a unit charge rate for the tariff based on the product name, event type, and the one or more charging parameter values associated with the product. Finally the invoked function calculates the billing charge based on the unit charge rate and a quantifying factor.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the claims that follow this description.

DETAILED DESCRIPTION OF THE INVENTION

The present invention relates to a charging framework for calculating charges associated with the delivery of telecommunications services. The charging framework serves as an extension of a telecommunications service provider's billing system and provides a thin easy to use configuration platform designed to reduce the amount of time required to configure new product and service offerings. The charging framework provides a uniform method of defining and calculating charges associated with charging tariffs attached.

An embodiment of the invention is specially adapted for use with Accenture's ACS for billing solution which is based on Intec's Singl.eView for convergent billing. Singl.eView is a sophisticated billing system configured to run on a Unix based application server in conjunction with an Oracle database. The charging framework of the present invention is a software layer that sits above Singl.eView Billing system. It should be noted, however, that the charging framework of the present invention is not limited to extending only the Singl.eView billing system only. The advantages and novel features of the charging framework are adaptable for use with other billing systems based on the same or other hardware platforms.

The charging framework of the present invention provides a standardized structured approach to configuring the charging tariffs associated with product and service offerings. The structured approach significantly reduces the time necessary to configure new tariffs and new product and service offerings because all of the low level tariff objects such as a common charging function, attribute types, reference types, forms, variables, and a unique derived attributes table, are already complete and ready to be drawn upon when new tariffs are created. When configuring a new tariff the only substantial effort required to support a new product offering is to define the price associated with the tariff. Furthermore, the structured approach to configuring tariffs allows a single common charging function to be applied to calculate the charges associated with the various tariffs attached to different product and service offerings. The single common charging function simplifies the process of configuring new product and service offerings and reduces the complexity of the processes necessary to calculate the charges associated with specific product and service instances.

The charging framework calculates charges for internally generated events such as recurring monthly charges, activation fees, deactivation fees, and the like. Internal events are those that arise within the billing system itself. Charges associated with external events, such as usage charges, which require input from external source such as external network switches are calculated separately. The charging framework calculates the price of recurring and non-recurring events on the basis of specific product and service attributes according to a predefined configurable charging tree.

Figure 1:
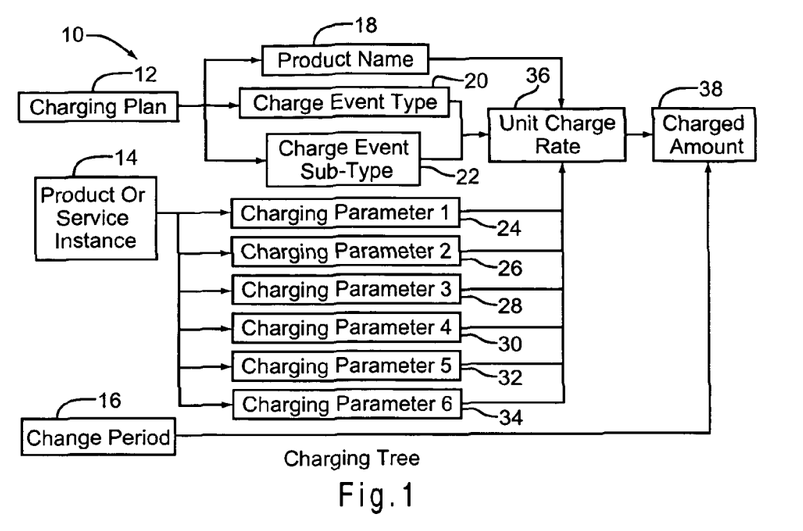
FIG. 1 shows an example of a pre-defined configurable charging tree.

The predefined charging tree according to an embodiment of the invention is shown in FIG. 1. The charging 10 shows the parameters that contribute to the calculation of a charge amount associated with a tariff attached to a particular product or service. The higher level inputs include a charging plan 12, a product or service instance 14, and a charge period 16. The charging plan 12 includes data regarding both the product and the tariff attached to the product. The charging plan 12 provides the produce name 18, a charge event type 20, and if necessary a charge event sub-type 22. For example, a product name might be "DSL High Speed Access." A tariff attached to the DSL high speed access product might be a recurring monthly service fee. The charge event type associated with the tariff therefore might be "recurring" and the charge event sub-type "DSL High Speed Access Recurring."

The product or service instance 14 relates to a specific product or service offering that is sold to a customer. The product or service instance provides at least one charging parameter that defines various attributes of the specific product or service instance. The charging parameters associated a product or service instance contribute to the calculation of the charge amount associated with the tariff. Charging parameters associated with a specific product or service instance might include things such as the price list applied to the product or service instance e.g., gold or silver, or the bandwidth allocated to the product or service instance, or other product attributes. According to an embodiment of the invention a product or service instance may include up to six charging parameters 24, 26, 28, 30, 32 and 34. However, in some cases product or service instances may be configured without any charging parameters. The product name 18, charge event type 20, charge event sub-type 22, and charging parameters 24, 26, 28, 30, 32, and 34 form a composite index key for locating a unit charge rate 36. The charge period 16 is a quantifying factor that is generated by the billing system and identifies the number of base time units for which a charge is to be calculated. For example, a tariff associated with a particular product may require a recurring monthly fee. The service, however, may only be billed on a bimonthly basis. In this case, when the bill is prepared the charge for the recurring monthly fee must be doubled to account for the two month billing period. Accordingly, the charge period would be set to 2. The final charged amount 38 is calculated by multiplying the identified unit charge rate 36 by the charge period 16.

As mentioned above, the charging framework forms an extension of a telecommunications service provider's billing system. The charging framework provides a single charging function for calculating the charges associated billing tariffs according to the predefined charging tree described above, and a unique charging function that accesses an editable derived attributes table for determining the unit charge rate to be applied when calculating charges for specific tariffs. The derived attributes table is accessed according to a composite index key that includes the product name, the event type and sub-type, and up to six charging parameters, as outlined in the charging tree of FIG. 1. All product and tariff configurations must be represented in the derived attributes table, so that when a charge associated with a tariff is to be calculated the corresponding unit charge rate can be found. The derived attributes table may be stored in the database associated with the billing system, however, the whole set of tariff parameters used at the charging level may be cached in memory in order to support the maximum flexibility in the way new product offerings are configured while also providing the best performance.

Product and service offerings are configured within the billing system with the aid of a graphical user interface (GUI). The product or service configuration establishes the product name, identifies the tariffs associated with the product or service, and defines the charging parameters that are available to define individual product or service offering. Preferably the charging parameter values selected for a particular product or service offering are selected from a predefined list of available parameter values in order to facilitate the configuration of new product and service offerings and the tariffs associated therewith. When a product or service is sold to a customer, the charging parameters that form the complete offering define the specific product or service instance associated with the customer.

Figure 2:
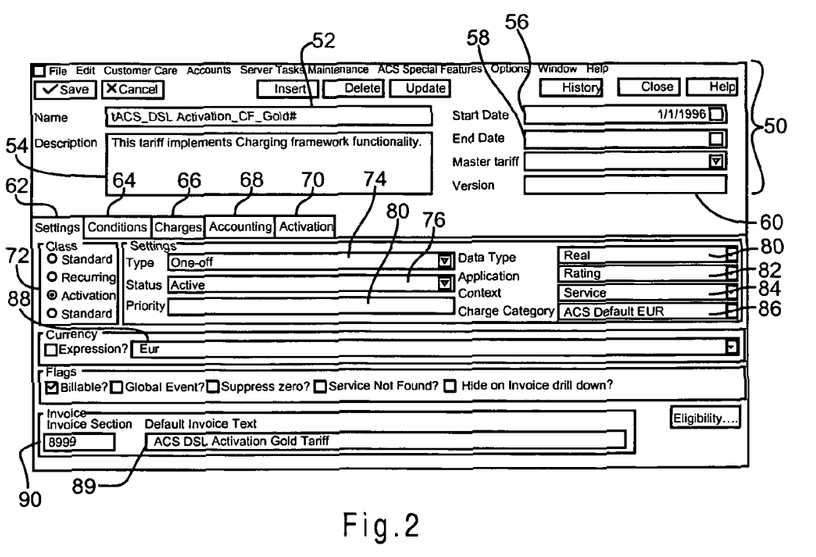
FIG. 2 shows a screen shot from the Singl.eView GUI used to configure tariffs showing a Tariff Configuration Page with the SETTINGS tab selected.
Figure 3:
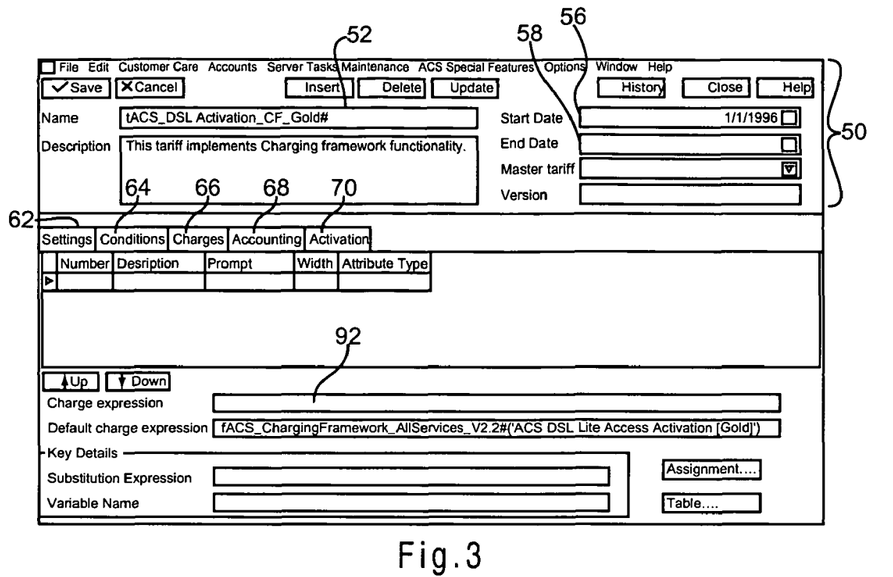
FIG. 3 shows a screen shot from the Singl.eView GUI used to configure tariffs showing a Tariff Configuration Page with the CHARGES tab selected.
Figure 4:
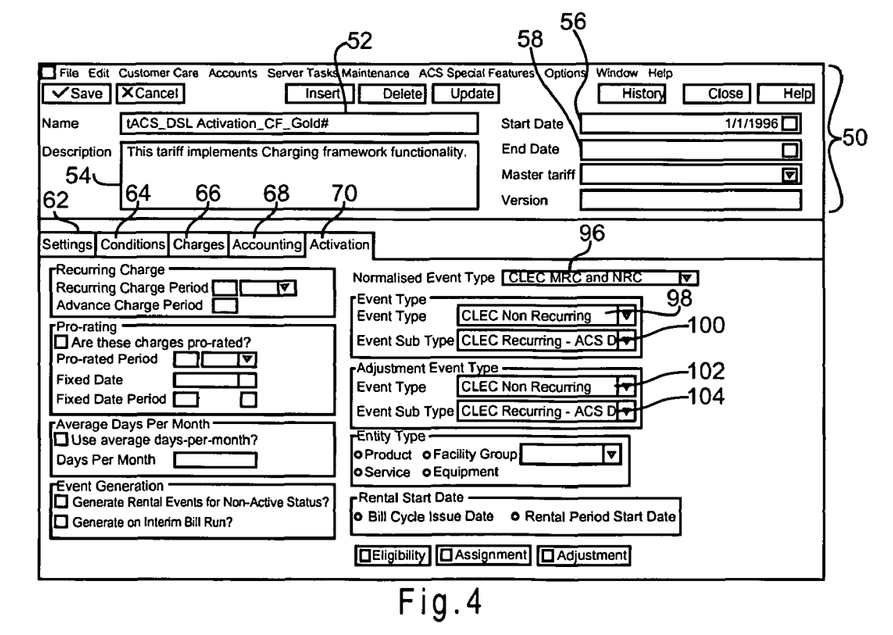
FIG. 4 shows a screen shot from the Singl.eView GUI used to configure tariffs showing a Tariff Configuration Page with the ACTIVATION tab selected.

The tariffs attached to the various products and services are configured in the charging framework using the billing system GUI. FIGS. 2, 3, and 4 show various screen shots from the Singl.eView billing system GUI related to tariff configuration. It should be noted that the tariff configuration screens of the billing system GUI are adapted to configure tariffs in the presence or absence of the charging framework of the present invention. Configuring a tariff without the aid of the charging framework is a much more complicated task. Accordingly, the tariff configuration pages of the billing system GUI contain many fields which are unnecessary when configuring tariffs in the charging framework. The description that follows is limited to those aspects of the tariff configuration GUI pages that are relevant to configuring a tariff within the context of the charging framework.

Configuring a tariff within the charging framework includes, among other things, identifying the product name of the product or service to which the tariff is attached, and defining the charge event type and charge event sub-type associated with the tariff. Each of the screen shots in FIGS. 2, 3, and 4 includes a tariff definition section 50. The tariff definition portion 50 includes a name field 52 for entering a Name for the tariff being configured. A Description field 54 is provided for entering a brief description of the tariff. Start Date and End Date fields 56, 58 are provided for specifying the time period during which the tariff will be in effect. If no date is specified in the end date field 58, the tariff may be in effect indefinitely. Finally, a Version field 60 allows the user configuring the tariff to define or assign a version designation to the tariff.

A series of selectable tabs 62, 64, 66, 68, and 70 control the fields displayed on the remainder of the tariff configuration page. FIG. 2 is a screen shot of the Singl.eView GUI display with the Settings tab 62 selected. From the tariff settings tab a user configuring a new tariff may select a tariff class, and enter a number of functional settings for the tariff. A tariff class may be defined by selecting one of the selectable tariff classes listed in a tariff class definition area 72. In the example shown, a tariff may be classified a standard; recurring; activation; or cancellation tariffs. Settings include the tariff type 74, status 76, priority 78; data type 80, application 82, context 84, and charge category 86. The tariff type 74 may be selected from list of pre-defined tariff types provided in a drop down menu associated with the tariff type field 72. The tariff type is limited to only those types that have been previously defined and are listed in the drop down menu. Examples of the selections that may be made for the tariff type field 74 include: Usage; recurring; one-off; discount; on-time discount; early payment discount; tax; or commission. The tariff status is entered in the status filed 74. Again, the status that may be entered in the status field 76 is limited to a list of predefined status values listed in the corresponding drop down menu. Examples of selections that maybe entered in the status field include: Active (the tariff is in use); or trial (the tariff is being tested). The type of data associated with the tariff is defined in the Data Type field 78, again selections are limited to the predefined data types listed in the corresponding drop down menu. Examples of data types include: Real; Real Array; or Real Hash. The application for which the tariff is intended is identified in the application field 78. Application entries are also limited to predefined applications listed in the drop down menu accompanying the application field 82. A typical list of applications include: Rating; or Billing. The context is defined in the context field 82. Again entries are limited to predefined contexts identified in the drop down menu associated with the context field 82. Examples include: Normalized Event; Customer; Customer Node; or Service. Tariffs based on the tariff type "usage" would generally be assigned to the application environment "Rating," and the context "Normalized Event." Tariffs based on other tariff types will generally be assigned to the application environment "Billing" and one of the contexts "Customer," "Customer Node," or "Service." A charge category may be defined in the charge category field 84 where again the selection of possible charge categories is limited to pre-defined charge categories found in the accompanying drop down menu. Examples include: ACS Default EUR, CLEC Default.

The currency in which a tariff charge is calculated may be entered in the currency field 84. An invoice section code may be entered in the invoice section field 86 to define where charges associate with the tariff will appear on a bill, and text describing the source of the charge may be entered in the default invoice text field 88.

FIG. 3 shows the Singl.eView GUI tariff configuration page with the Charges Tab 66 selected. This page allows the user to enter charging expression to define the manner in which the charge associated with the tariff is calculated. However, within charging framework all internal tariff charges are calculated using a single charging function. Thus, a single function call is entered in the Default Charge Expression field 92. The, the function call identifies the function being called and the product name to which the tariff is to be attached. Thus, in the example shown in FIG. 3 the Default Charging Expression 92 includes the charging function name ACS_Chargingframework_allservices_V2.2, and the product name ACS DSL Lite Access Activation (Gold) to which the tariff being configures is attached.

FIG. 4 shows the Singl.eView GUI tariff configuration page with the activation tab 94 selected. A normalized event type associated with the tariff is defined in the normalized event type field 96. A normalized event is an object created by the billing system whenever a charge associated with the tariff must be calculated. The normalized event type specifies the type of recurring charge to be generated when the tariff is invoked. The specified normalized event type determines the manner in which the normalized event is formatted. Normalized event types are configurable and may be selected from a list of pre-configured normalized event types contained in a drop down menu associated with the normalized event type field 96. Examples of predefined normalized event types include: CLEC (Competitive Local Exchange Carrier, MRC (Monthly Recurring Charge) and NRC (Non-Recurring Charge, and so forth. Moreover it should be noted that these are merely labels that have been defined when configuring normalized event types. The tariff event type and event sub-type are defined in the Event Type and Event Sub-Type fields 98, 100 respectively. Again, the event type and event sub-type maybe selected from predefined lists of event types and event sub-types contained in drop down menus associated with each field. Examples of predefined event types include: CLEC Non-Recurring; and CLEC Recurring. Examples of predefined event sub-types include: ACS ADSL Modem Activation; and ACS ADSL Recurring. An adjustment event type and an adjustment event sub-type may be defined in the adjustment event type and adjustment event sub-type fields 102, 104. Again, selections are limited to predefined adjustment event types and adjustment event sub-types contained in the corresponding drop down menus. Finally, an entity type may be selected by making a selection from among the various entity types listed in the entity type selection block 106. The entity type defines the type of entity with which the tariff will be attached, such as it a product, a service, equipment or other.

Figure 5A:
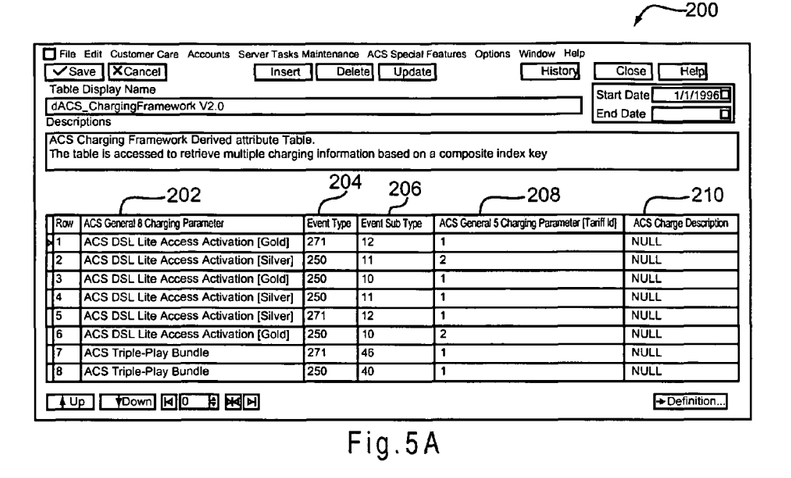
FIGS. 5A and 5B show separate portions of a Derived Attributes Table displayed by the Singl.eView GUI used to configure tariffs.
Figure 5B:
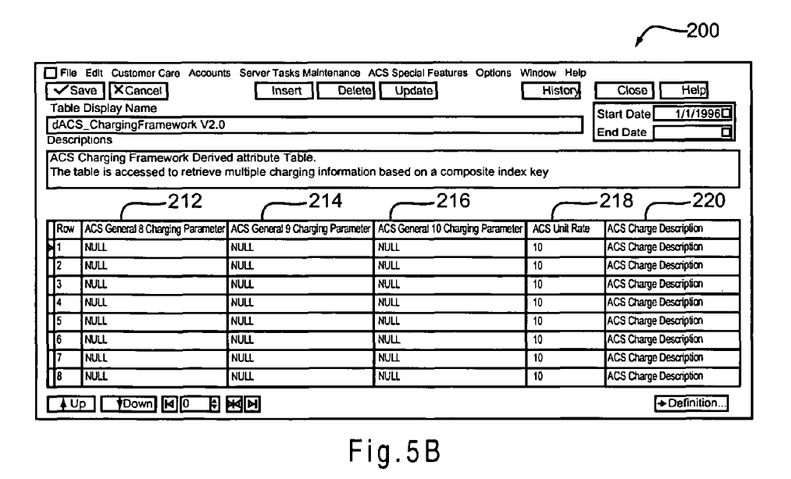

A final component of configuring products and tariffs in the charging framework is updating the derived attributes table. As mentioned above, the derived attributes table defines the unit charge rate to be applied for every configured tariff attached to every configured product. Accordingly, if a new tariff is configured the derived attributes table must be updated to reflect the change. FIGS. 5A and 5B show a portion of a derived attributes table 200 according to an embodiment of the invention. The derived attributes table includes a plurality of columns defining the data variables necessary to distinctly identify every tariff associated with every product offering configured in the billing system, the unit charge rate associated with each tariff, and any additional charging information relevant to calculating the charges associated with each tariff. Thus, the column headings for the derived attributes table include the product name 202, the event type 204, the event sub-type 206, General 5 Charging Parameter (tariff ID) 208; General 6 Charging Parameters 210; General 7 Charging Parameter (not shown); General 8 charging parameter (not shown); General 9 charging parameter (not shown); General 10 Charging Parameter 212, Unit Rate 214, Charge Description 216; Charge info. 1 218; and Charge Info 2, Charge Info 8 (not shown).

Each row of the derived attributes table represents a tariff attached to a particular product or service offering. The derived attributes table is accessed based on a composite index key comprising the product name, event type, event sub-type, and charging parameters 1-6 (General 5-General 10) and returns corresponding charging information including the unit charge rate the charge description and charge info 1-8. When a unit charge or other charging information for a particular tariff must be retrieved, the row of the derived attributes table that stores the same and the unit charge rate and other charging parameters stored in that row are returned as results. Thus, the derived attributes table functions as a large look up table for identifying the unit charge rate and other charging information for every tariff configures in the billing system.

Figure 6:
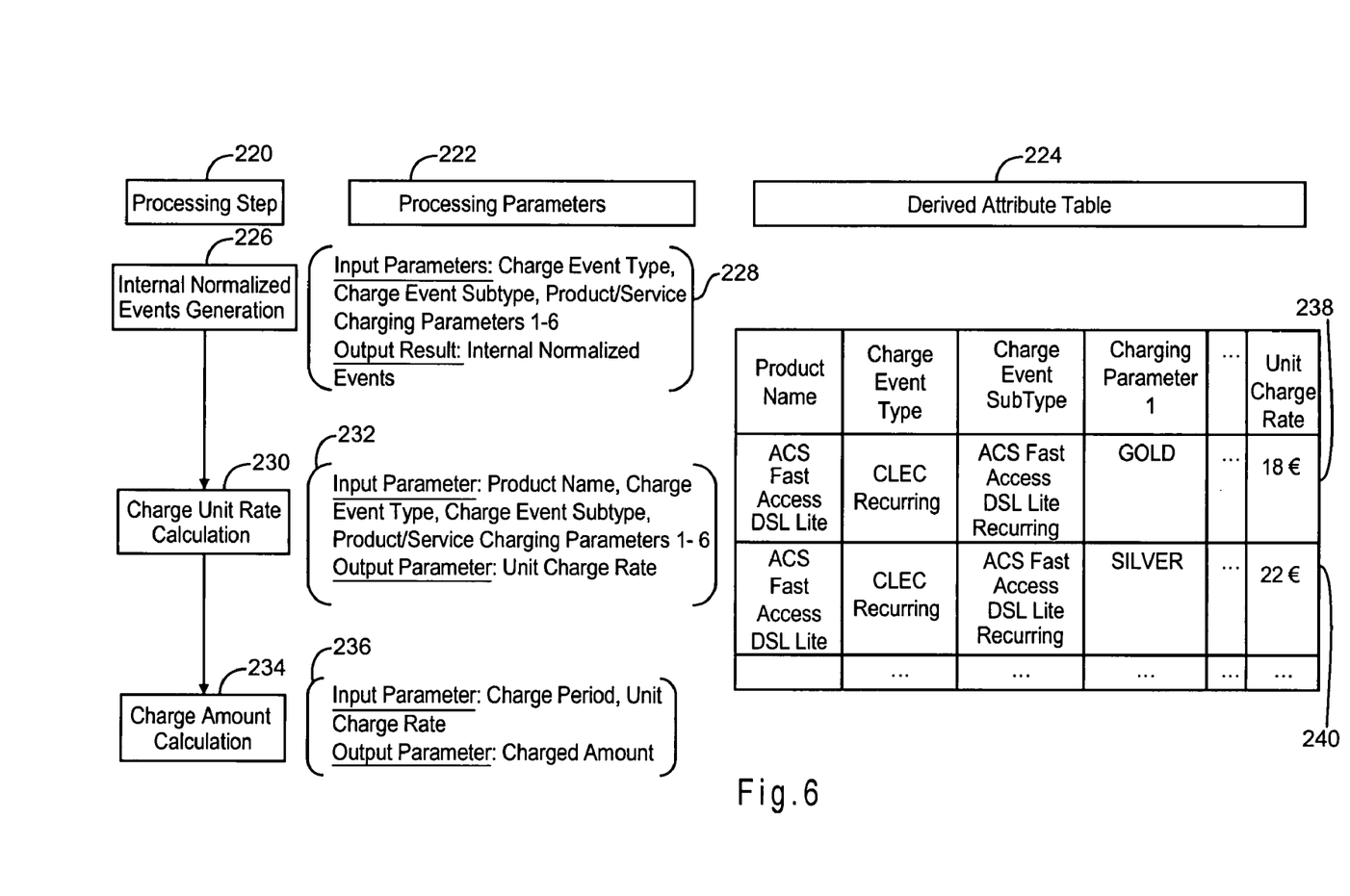
FIG. 6 shows a workflow diagram of the charging process implemented on the charging framework of the invention.

The advantages of storing unit charge rates and other charging information in the derived attributes table will become apparent when one considers the processes involved producing a bill and calculating the charges associated with internally generated billing events. FIG. 6 is a workflow diagram illustrating the charging process implemented at the tariff level by the charging framework of the present invention. FIG. 6 shows processing steps 220, the corresponding processing parameters 222, and a simplified derived attributes table 224 for calculating charges.

The first processing step is the generation of internal normalized events 226. Internal normalized events are events generated within the billing system and which require the calculation of a charge. For example, when a customer subscribes to a service having a recurring monthly charge, the amount of the monthly charge must be calculated each month when the customer's bill is generated. The recurring monthly tariff generates an internal event that must be priced. The processing parameters 228 associated with the generation of internal normalized events include the input parameters Charge Event Type; Charge Event Sub-Type; And Product/Service Charging Parameters 1-6. The output result of the internal normalized events generation is the internal normalized event itself. The internal normalized event is represented as a row of an oracle database table normalized_event. Table created and updated by the billing system. The normalized events table includes columns corresponding to the input parameters associated with the generated event.

Once the internal normalized event has been generated, the next general processing step is to calculate the unit charge rate associated with the event. The input parameters to the unit charge rate calculation step are the product name, charge event type, charge event sub-type, and product/service charging parameters 1-6. These input parameters are used as the composite index key to access the derived attributes table to identify the appropriate row corresponding to the generated event and return the corresponding unit charge rate. For example, suppose a normalized internal event is generated with the product name Fast Access DSL Lite having a charge event type "recurring," event sub-type Fast Access DSL Lite Recurring, and wherein the charging parameter 1 (internal normalized event general 5 parameter) is Gold. A query of the simplified derived attributes table 224 with the specified composite index key would identify the first row 238 of the simplified table 224, and return a unit charge rate of 18€. Similarly, suppose a second internal normalized event has a product name Fast Access DSL Lite, a charge event type "Recurring," a charge event sub-type Fast Access DSL Lite Recurring, and a charging parameter 1 (internal normalized event general 5 parameter) Silver. A query of the derived attributes table 224 with the specified composite index key of this second internal normalized event would identify the second row 240 of the simplified derived attributes table, and return a unit charge rate of 22€.

Once the unit charge rate has been calculated the final processing step is calculating the charge amount 234. The input parameters 236 associated with this step are the charge period and the unit charge rate. As mentioned above, the charge period is generated by the billing system itself. The unit chart rate is returned from the derived attributes table. The final charge amount is calculated by simply multiplying the unit charge rate by the charge period. The calculated charge amount may be used by the billing system to generate an invoice or bill to charge the customer for the particular product or service that generated the normalized event.

Figure 7:
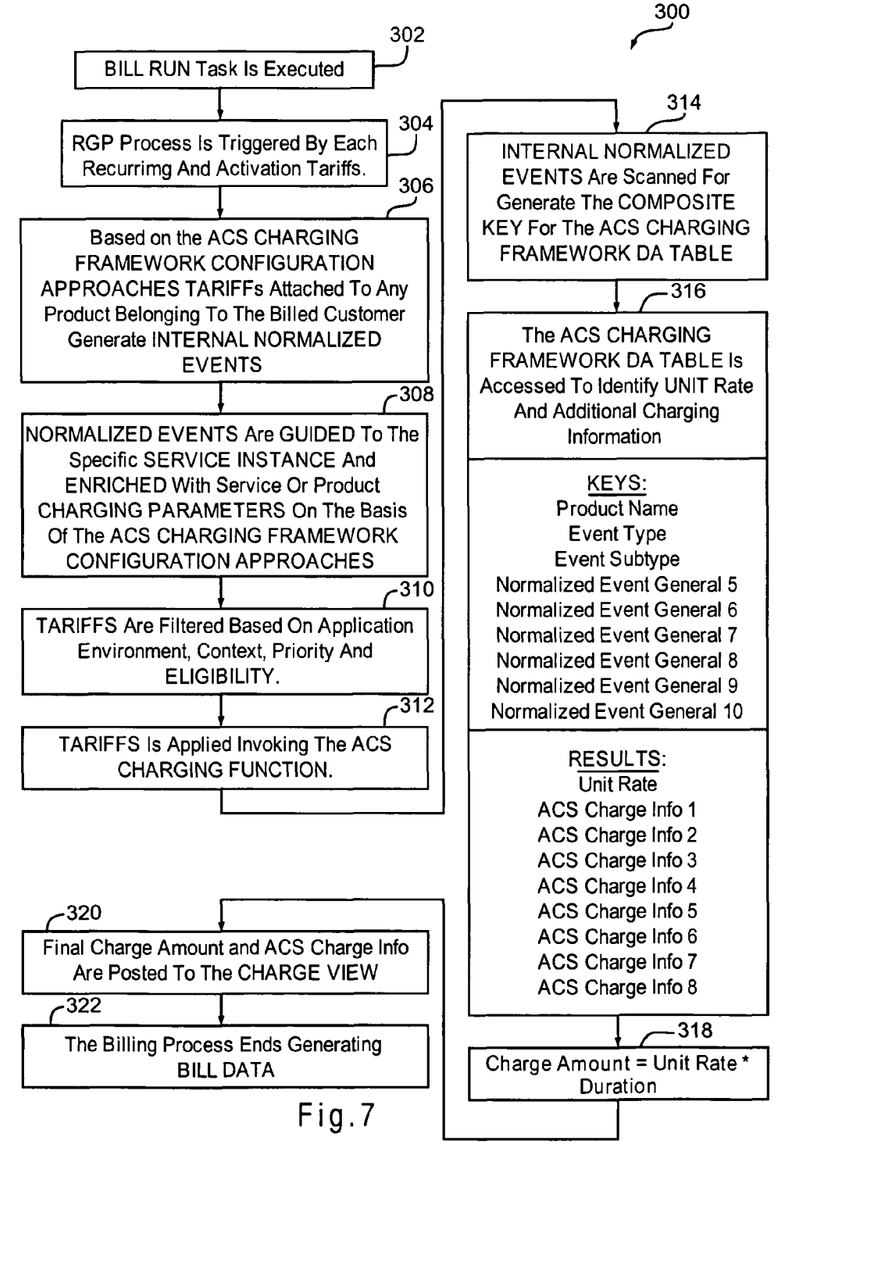
FIG. 7 shows a charging framework process flow chart.

FIG. 7 is flow chart 300 showing the operation of the charging framework in the context of generating a customer bill. The billing process begins when a billing run is initiated at 302. During the course of a billing run the products associated with each customer are identified and the relevant charges associated with each product are calculated to generate bills that may be sent to the customers. The billing system pulls the product configuration for each product or service purchased by a customer from the billing system database. The specific product or service offering sold to a customer, including all of the charging parameters associated with the product or service offering, comprises a product or service instance.

A rental generation process (RGP) is triggered at 304 by each internally generated tariff, such as tariffs for recurring charges, one-time activation fee, and the like. The RGP process is the trigger that indicates a charge must be calculated. Tariffs attached to the products owned by a customer generate normalized internal events at 306. Generating a normalized internal event comprises adding a row to an Internal Normalized Events Table within the billing system. The normalized events table includes a number of general data fields, in particular normalized event general 5 through normalized event general 10 fields which can be used to store charging parameter data at 308. The normalized event is guided to the product configuration data of the particular product or service instance for which a charge is to be calculated based on the product name defined in the tariff that initiated the internal normalized event. The internal normalized event is enriched with the charging parameters of the particular product or service instance. Specifically the charging parameters from the product configuration of the product or service instance are written to the normalized event general 5-normalized event general 10 fields of the internal normalized event. The product, product name, event type and event sub-type are received from the configuration of the tariff itself.

Next, the tariffs are filtered at 310 based on factors such as the application, environment, context, priority and eligibility. Eligibility is a parameter that may be defined when a tariff is configured. A tariff's eligibility is used to set-up a list of expressions that must be satisfied for the tariff to be applied. In particular, using the eligibility expression list, it is possible to filter out tariffs that are not eligible for specific normalized events. Within the charging framework, eligibility is used to ensure that the correct tariffs are applied, by setting up the eligibility expression list in order to filter the tariffs based on the event type and event sub-type, present in the normalized event that is being processed. Once the tariffs have been filtered, the tariff is applied by invoking the standardized charging function at 312. All internal tariff events are processed in the same manner by the ACS charging function. Internal normalized events are scanned at 314 to generate the composite key for accessing the charging framework Derived Attributes Table. Thus, the composite index key includes the product name, event type, event sub-type and any charging parameters stored in the normalized event general fields 5-10.

The Derived Attribute Table is accessed at 316 and returns results that include the unit charge rate and any relevant charge information. The charge amount is calculated at 318 by multiplying the returned unit charge rate by the duration. As mentioned earlier, the duration is a parameter supplied by the billing system and indicates how many billing units apply, for example, a monthly fee billed every other month would have a duration of 2 so that the total charge would be twice the unit charge rate. At 320 the final charge amount and any additional charge data returned from the derived attribute table are passed to a billing process that applies the calculated charge to the bill that is being processed. Finally, the billing process ends at 322 with the generation of the billing data.

For completeness of disclosure the source code for the charging framework charging function according to an embodiment of the invention is presented below.

```
# NAME:
#    fACS_TP_ChargingFramework##

# DESCRIPTION:
#    This function determines the unist charge for recurring/activation
tariff and additional charging information.
#    The lookup to determine the rate and additional charging parameters
is based on the following composite index:
#    1/ product name
#    2/ Event Type (from event)
#    3/ Event Sub Type (from event)
#    4/ general 5 (Tariff Id) (from NORMALIZED EVENT GENERAL 5 field)
#    5/ general 6 (from NORMALIZED EVENT GENERAL 6 field)
#    6/ general 7 (from NORMALIZED EVENT GENERAL 7 field)
#    7/ general 8 (from NORMALIZED EVENT GENERAL 8 field)
#    8/ general 9 (from NORMALIZED EVENT GENERAL 9 field)
#    9/ general 10 (from NORMALIZED EVENT GENERAL 10 field)

# PARAMETERS:
#    product name

# RETURNS:
#    Charge

#---------------------------------------------------------------------
fACS_ChargingFramework_AllServices_V2.2#(const ProductName$) =
{
    var I_Charge# := 0.00;
    var I_Results?[ ];
    var I_MRC_Index?[ ];
    const I_MRC_DA$ := 'dACS_ChargingFramework_V2.0';
    var IProductFieldValues?[ ];
    # Define index for lookup
    I_MRC_Index$[0] := ProductName$;
    I_MRC_Index&[1] := EventTypeCode&;
        I_MRC_Index&[2] := EventSubTypeCode&;
#-1;# *Any*
    if (General5$ = '')
        then {I_MRC_Index$[3] := 'NULL';}
        else {I_MRC_Index$[3] := General5$;};
    if (General6$ = '')
        then {I_MRC_Index$[4] := 'NULL';}
        else {I_MRC_Index$[4] := General6$;};
    if (General7$ = '')
        then {I_MRC_Index$[5] := 'NULL';}
        else {I_MRC_Index$[5] := General7$;};
    if (General8$ = '')
        then {I_MRC_Index$[6] := 'NULL';}
        else {I_MRC_Index$[6] := General8$;};
    if (General9$ = '')
        then {I_MRC_Index$[7] := 'NULL';}
        else {I_MRC_Index$[7] := General9$;};
    if (General10$ = '')
        then {I_MRC_Index$[8] := 'NULL';}
        else {I_MRC_Index$[8] := General10$;};
    if DerivedTableLookupByDatex&(I_MRC_DA$,
            ChargeStartDate~,
            I_MRC_Index?[ ],
            I_Results?[ ])
    then
    {
        I_Charge# := I_Results#[0]*Duration#;
        #assign return values to DA vairbales
```

-continued

```
        dACS_ChgFramework_General1$ := to_string(I_Results?[0]);
        dACS_ChgFramework_General2$ := to_string(I_Results?[1]);
        dACS_ChgFramework_General3$ := to_string(I_Results?[2]);
        dACS_ChgFramework_General4$ := to_string(I_Results?[3]);
        dACS_ChgFramework_General5$ := to_string(I_Results?[4]);
        dACS_ChgFramework_General6$ := to_string(I_Results?[5]);
        dACS_ChgFramework_General7$ := to_string(I_Results?[6]);
        dACS_ChgFramework_General8$ := to_string(I_Results?[7]);
    }
    return I_Charge#;
}
```

The standard charging function and the derived attribute table allow tariffs to be configured and implemented much more easily and allows the charges associated with internal tariff events to be calculated in a much more efficient manner than in traditional billing systems.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A system extension for a billing system adapted to generate customer bills associated with the delivery of telecommunications products and services, wherein the billing system includes software instructions adapted to be executed on a computer server platform, a database for storing product configuration data for a plurality of product offerings and billing tariffs attached to the product offerings, and a user interface allowing a user to interact with and configure portions of the system, the system extension comprising:

a composite index key for accessing a particular unit charge rate for a particular tariff of the plurality of billing tariffs attached to a particular product offering of the plurality of product offerings, wherein the composite index key includes key parameters for uniquely identifying the particular tariff;

an editable derived attributes table that identifies the particular unit charge rate for the particular tariff attached to the particular product offering and that associates the unit charge rate with the composite index key; and a charge calculation function operable to:

assemble the composite index key from the key parameters;

index the editable derived attributes table with the composite index key to obtain a determined particular unit charge rate; and calculate a charge amount for the particular tariff attached to the particular product offering based on the particular unit charge rate determined in the editable derived attributes table with the composite index key.

2. The system extension of claim 1 wherein the derived attributes table is adapted to store configuration parameter values for the plurality of billing tariffs.

3. The system extension of claim 2 wherein the configuration parameters relate to input composite key parameters and at least one output results parameter.

4. The system extension of claim 3 wherein the input composite key parameters further include a product name entry that identifies the particular product offering.

5. The system extension of claim 3 wherein at least one output results parameter includes the unit charge rate.

6. The system extension of claim 1 wherein the charging function is further operable to multiply the determined particular unit charge rate by a quantifying value.

7. The system extension of claim 1,
wherein the editable derived attributes table stores a plurality of product name parameter values, a plurality of event type parameter values, a plurality of charging parameter values, and plurality of unit charge rates including the particular unit charge rate, associated with the plurality of billing tariffs; and
wherein the charge calculation function is further operable to:
identify a particular product name parameter value, a particular event type parameter value, and a particular charging parameter value for a telecommunications event for which a charge will be calculated,
access the editable derived attributes table to extract the particular unit charge rate associated with the particular tariff by locating in the editable derived attributes table the particular tariff using the particular product name parameter value, particular event type parameter value, and particular charging parameter value.

8. The system extension of claim 1 wherein the key parameters include:
an event type entry that identifies a recurring charge type to be generated when the particular tariff is invoked;
an event sub-type entry that identifies a sub-type of the recurring charge type; and
a charging parameter that distinguishes product instances.

9. A method of calculating a charge associated with the delivery of telecommunications products, the method comprising:
creating a charge lookup table for assigning base charges to tariffs, the charge lookup table including a plurality of stored tariffs, each identifiable by a unique first set of identifiers;
configuring a tariff associated with a telecommunications product, the configured tariff and the product defining a second set of identifiers capable of identifying the tariff from among a plurality of other tariffs;
accessing the look up table and locating a stored tariff having a first set of identifiers corresponding to the second set of identifiers of the configured tariff to obtain the base charge assigned to the stored tariff; and
calculating the charge associated with the delivery of the telecommunications product with which the configured tariff is associated based on the obtained base charge.

10. The method of calculating a charge associated with the delivery of telecommunications products of claim 9 wherein the identifiers include a product name, an event type, and a charging parameter.

11. The method of calculating a charge associated with the delivery of telecommunications products of claim 10 wherein the identifiers further include an event sub-type.

12. The method of calculating a charge associated with the delivery of telecommunications products of claim 10 wherein the identifiers further include a plurality of charging parameters.

13. The method of calculating a charge associated with the delivery of telecommunications products of claim 10 further comprising creating a normalized event record in response to the tariff, the normalized event storing data regarding the tariff and the product.

14. The method of calculating a charge associated with the delivery of telecommunications products of claim 13 wherein the normalized event record receives and stores the product name and the event from the tariff configuration and the charging parameter from the product configuration.

15. The method of calculating a charge associated with the delivery of telecommunications products of claim 14 further comprising compiling a composite index key for accessing the charge look up table based on the product name, event type and charging parameter value stored in the normalized event record.

16. The method of calculating a charge associated with the delivery of telecommunications products of claim 9 wherein calculating the charge comprises multiplying the base charge by a quantifying factor.

17. A method of calculating a billing charge, the method comprising:
configuring a product offering to include a product name parameter, a tariff parameter, and a charging parameter;
creating a configured tariff that identifies an event type, wherein the tariff is identified by the tariff parameter of the product offering;
generating a normalized internal event based on the configured tariff;
enriching the normalized internal event with a charging parameter value of the charging parameter of the product offering; and
invoking a charging function configured to:
assemble a composite index key, the composite index key including key parameters for uniquely identifying the configured tariff:
identify the normalized internal event by determining that it has values corresponding to the key parameters;
obtain a particular unit charge rate from the normalized internal event; and
calculate a billing charge from the unit charge rate and a quantifying factor.

18. The method of calculating a billing charge of claim 17 further comprising creating a derived attributes table for assigning a plurality of unit charge rates, the plurality of unit charge rates including the particular unit charge rate, to each of a plurality of billing tariffs, the plurality of billing tariffs including the configured tariff.

19. The method of calculating a billing charge of claim 18 wherein the derived attributes table comprises a plurality of rows and columns, the rows individually corresponding to billing tariffs and the columns corresponding to attribute parameters and a unit charge rate associated with each of the billing tariffs and the products with which they are associated, each billing tariff in the table being identifiable by a unique set of attribute parameter values stored in the row corresponding to the particular billing tariff.

20. The method of calculating a billing charge of claim 19 wherein obtaining the particular unit charge rate from the normalized internal event comprises:
identifying a row in the derived attributes table storing attribute parameter values corresponding to:
the event type identified by the configured tariff on which the normalized internal event is based; and
the product name parameter and the charging parameter of the product offering associated with the configured tariff on which the normalized internal event is based; and
returning the particular unit charge rate stored in the identified row.

21. The method of calculating a billing charge of claim 18, further comprising:
accessing the derived attributes table with the composite index key; and returning the unit charge rate associated with the tariff identified by the composite index key.

22. The method of calculating a billing charge of claim 17 wherein generating a normalized event comprises creating a normalized event record adapted to store attribute parameter values associated with the tariff and the product offering that includes the tariff.

23. The method of calculating a billing charge according to claim 17, wherein the key parameters include:
   a product name entry that identifies the product offering;
   an event type entry that identifies a recurring charge type to be generated when the configured tariff is invoked; and
   a charging parameter that distinguishes product instances.

24. A method of calculating a charge associated with the delivery of telecommunications services, the method comprising:
   attaching a tariff to a product offering, wherein the product offering and the tariff define parametric attribute values;
   implementing an editable derived attributes table that identifies a unit charge rate for the tariff attached to the product offering, wherein the unit charge rate is accessed by a composite index key;
   storing the parametric attribute values defined by the product offering and the tariff in the editable derived attributes table, wherein the parametric attribute values uniquely identify the tariff;
   assembling the composite index key for accessing the unit charge rate for the tariff attached to the product offering, the composite index key comprising the parametric attribute values;
   using the composite index key to identify the tariff in the editable derived attributes table;
   returning the unit charge rate of the tariff; and
   calculating a charge base on the unit charge rate.

25. The method of claim 24 wherein the parametric attribute values include:
   an event type parameter that identifies a recurring charge type to be generated when the tariff attached to the product offering is invoked;
   an event sub-type parameter that identifies a sub-type of the recurring charge type; and
   a charging parameter that distinguishes product instances.

26. The method of claim 25 wherein the parametric attribute values further includes a product name parameter that identifies the product offering.

27. The method of claim 26 further comprising creating an event record, wherein the event record receives and stores values for the product name parameter and the event type parameter from the tariff.

28. The method of claim 27 further comprising enriching the event record with the parametric attribute values for the charging parameter.

* * * * *